United States Patent
Chang et al.

(10) Patent No.: US 11,402,994 B2
(45) Date of Patent: Aug. 2, 2022

(54) METHOD AND APPARATUS FOR CALLING SHORTCUT FUNCTION, AND STORAGE MEDIUM

(71) Applicant: Beijing Xiaomi Mobile Software Co., Ltd., Beijing (CN)

(72) Inventors: Qun Chang, Beijing (CN); Bin Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/144,969

(22) Filed: Jan. 8, 2021

(65) Prior Publication Data

US 2021/0247897 A1    Aug. 12, 2021

(30) Foreign Application Priority Data

Feb. 10, 2020   (CN) .......................... 202010085226.1

(51) Int. Cl.
   *G06F 3/048*       (2013.01)
   *G06F 3/04883*     (2022.01)
   *G06F 9/451*       (2018.01)
   *G06F 3/044*       (2006.01)

(52) U.S. Cl.
   CPC .......... *G06F 3/04883* (2013.01); *G06F 3/044* (2013.01); *G06F 9/451* (2018.02)

(58) Field of Classification Search
   CPC ....... G06F 9/451; G06F 3/044; G06F 3/04883
   See application file for complete search history.

(56) References Cited

U.S. PATENT DOCUMENTS

| 2012/0154324 | A1  |  6/2012 | Wright et al. |
| 2013/0181941 | A1* |  7/2013 | Okuno .................... G06F 3/041 345/174 |
| 2014/0033140 | A1* |  1/2014 | Zeng .................. G06F 3/04847 715/863 |
| 2014/0164953 | A1* |  6/2014 | Lynch .................. H04L 51/046 715/753 |
| 2016/0291831 | A1* | 10/2016 | Baek .................... G06F 3/04817 |
| 2017/0090653 | A1* |  3/2017 | Seo ...................... G06F 3/04883 |
| 2017/0255325 | A1* |  9/2017 | Xiao .................... G06F 3/0447 |

OTHER PUBLICATIONS

Extended European Search Report in Application No. 20217515.4, dated Jun. 21, 2021.
Office Action dated Jan. 3, 2022, from the Intellectual Property of India issued in counterpart Indian Application No. 202044056826.

* cited by examiner

*Primary Examiner* — Rashawn N Tillery
(74) *Attorney, Agent, or Firm* — Finnegan, Henderson, Farabow, Garrett & Dunner, L.L.P.

(57) ABSTRACT

A method for a device to call a shortcut function, includes: recognizing whether a touch operation is a gesture operation for calling the shortcut function when the touch operation is detected; and calling the shortcut function corresponding to the gesture operation in response to recognizing that the touch operation is the gesture operation for calling the shortcut function.

13 Claims, 7 Drawing Sheets

METHOD AND APPARATUS FOR CALLING SHORTCUT FUNCTION, AND STORAGE MEDIUM

CROSS-REFERENCE TO RELATED APPLICATION

The present application is based upon and claims priority to Chinese Patent Application No. 202010085226.1, filed on Feb. 10, 2020, the entirety contents of which are incorporated herein by reference.

TECHNICAL FIELD

The present disclosure relates to a field of shortcut application technologies, and more particularly to a method and an apparatus for calling a shortcut function, and a storage medium.

BACKGROUND

Conventionally, common key shortcuts in a mobile terminal include three virtual keys which are a home key, a back key and a menu key.

With the popularization of full-screen technologies of the mobile terminal, a way of using a virtual key to call a shortcut function in the mobile terminal needs be improved.

SUMMARY

According to a first aspect of embodiments of the present disclosure, a method for a device to call a shortcut function includes: recognizing whether a touch operation is a gesture operation for calling the shortcut function when the touch operation is detected; and calling the shortcut function corresponding to the gesture operation in response to recognizing that the touch operation is the gesture operation for calling the shortcut function.

According to a second aspect of embodiments of the present disclosure, an apparatus for calling a shortcut function includes: a processor; and a memory storing instructions executable by the processor, wherein the processor is configured to: recognize whether a touch operation is a gesture operation for calling the shortcut function when the touch operation is detected; and call the shortcut function corresponding to the gesture operation in response to recognizing that the touch operation is the gesture operation for calling the shortcut function.

According to a third aspect of embodiments of the present disclosure, a non-transitory computer readable storage medium has stored thereon instructions that, when executed by a processor of a device, cause the device to perform a method for calling a shortcut function, the method including: recognizing whether a touch operation is a gesture operation for calling the shortcut function when the touch operation is detected; and calling the shortcut function corresponding to the gesture operation in response to recognizing that the touch operation is the gesture operation for calling the shortcut function.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure, and serve to explain the principle of the present disclosure together with the specification.

DETAILED DESCRIPTION

Exemplary embodiments will be described in detail below, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with some aspects of the present disclosure as described in the appended claims.

As noted in the Background, in order to facilitate a user to quickly access an application function, three virtual keys, which are a home key, a back key and a menu key, may be used in a mobile terminal. As a full-screen mobile terminal becomes more and more popular, using the virtual key to call a shortcut function may be limited. Therefore, there is a need for a new way for calling the shortcut function in the mobile terminal.

Embodiments of the present disclosure provide a method for calling a shortcut function for a mobile terminal, such that the user may not be limited to various keys of the mobile terminal, and can quickly activate a designated function.

Figure 1:
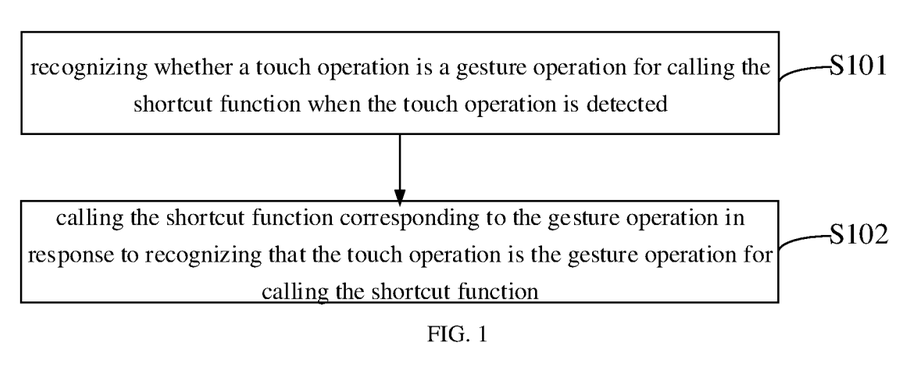
FIG. 1 is a flow chart of a method for calling a shortcut function according to an exemplary embodiment.

FIG. 1 is a flow chart of a method for calling a shortcut function according to an exemplary embodiment. As illustrated in FIG. 1, the method may include the following steps.

At step S101, it is recognized whether a touch operation is a gesture operation for calling a shortcut function when the touch operation is detected.

In an embodiment, the gesture operation may be set based on an actual situation.

In an embodiment, the shortcut function corresponding to the gesture operation may be set based on an actual requirement. For example, the shortcut function may be a screen-shot function, a recording function, an image capturing function, a voice assistant function, a screen-off function, a function for activating a flashlight, a function for splitting a screen and a function for activating an intelligent assistant, such as an intelligent speaker, which is not limited in the present disclosure.

At step S102, the shortcut function corresponding to the gesture operation is called in response to recognizing that the touch operation is the gesture operation for calling the shortcut function.

In an embodiment, when it is recognized that the touch operation is the gesture operation for calling the shortcut function, the shortcut function corresponding to the gesture operation is called.

In an embodiment, the gesture operation drawing a closed figure on a screen of the mobile terminal by means of tapping corresponds to the screenshot function. When the user draws a closed circle on the screen of the mobile terminal by the means of tapping, a picture may be intercepted along a trajectory of the closed circle.

In an embodiment, a gesture operation with successive tapping twice corresponds to the function for activating an intelligent assistant, such as an intelligent speaker. When the user taps the screen of the mobile terminal twice in succession, the intelligent speaker may be started.

With the method for calling the shortcut function provided by the present disclosure, the shortcut function corresponding to the gesture operation is called in response to recognizing that the touch operation is the gesture operation for calling the shortcut function. In this way, calling the shortcut function is provided for the mobile terminal, such that the user may not be limited to various keys of the mobile terminal. When the mobile terminal has a full screen, it is convenient for the user to quickly turn on the designated function, and user experience is improved.

Figure 2:
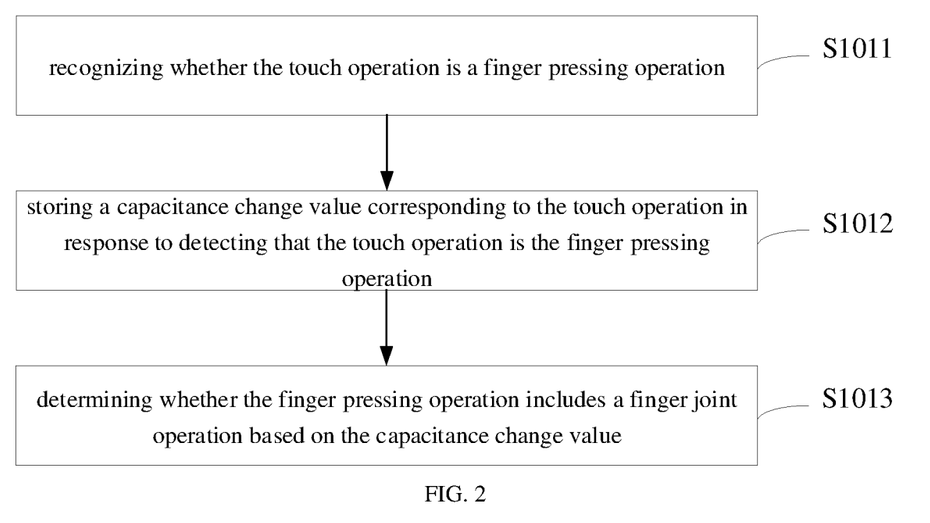
FIG. 2 is a flow chart of a method for recognizing whether a touch operation is a gesture operation for calling a shortcut function according to an exemplary embodiment.

FIG. 2 is a flow chart of a method for recognizing whether a touch operation is a gesture operation for calling a shortcut function (step S101 in FIG. 1) according to an exemplary embodiment. As illustrated in FIG. 2, the method for recognizing whether the touch operation is the gesture operation for calling the shortcut function may include the following steps.

At step S1011, it is recognized whether the touch operation is a finger pressing operation. The finger pressing operation may be a pressing operation by a single finger (namely, a single finger processing operation) or a pressing operation by multiple fingers (namely, a multi-finger processing operation).

At step S1012, a capacitance change value corresponding to the touch operation is stored in response to detecting that the touch operation is the finger pressing operation.

In an embodiment, when it is detected that the touch operation is the finger pressing operation, data, which may be raw data indicating the capacitance change value, corresponding to the finger pressing operation is stored. The capacitance change value corresponding to the finger pressing operation may be stored at a storage node, such as an input node.

In an embodiment, the capacitance change value of the touch operation being the finger pressing operation is stored at the storage node separately. During determining whether the finger pressing operation includes a finger tapping operation based on the capacitance change value, the capacitance change value may be quickly and conveniently obtained from the storage node, which greatly simplifies a calculation amount and improves a work efficiency.

In an embodiment, when it is detected that the touch operation is not the finger pressing operation, the raw data corresponding to the touch operation is not separately stored at the storage node.

At step S1013, it is determined whether the finger pressing operation includes a finger joint operation based on the capacitance change value.

A finger joint operation may be an operation performed by a user's finger through the user's finger joint. In an embodiment, the finger joint operation may be a finger tapping operation. The finger joint operation may be a single-finger tapping operation, a multi-finger tapping operation or other forms of finger tapping operations.

In an embodiment, an input module (input reader) communicates with a driver via a node, and takes out the raw data (that is, the capacitance change value corresponding to the finger pressing operation) of the finger pressing operation from the storage node of hardware (e.g., firmware). Based on the capacitance change value, an artificial intelligence (AI) algorithm corresponding to the operation may be used to determine whether the finger pressing operation includes the finger joint operation. The input module directly takes out the raw data of the finger pressing operation from the storage node, which reduces a procedure for discriminating and obtaining the data corresponding to the finger pressing operation from numerous touch operation data, simplifies the calculation amount and improves the work efficiency.

In an embodiment, before the input module communicates with the driver via the node, and takes out the data of the finger pressing operation from the storage node of the hardware, the method for calling the shortcut function also includes: determining whether that the touch operation is the finger pressing operation. The finger pressing operation may be the single finger pressing operation.

When the touch operation is the finger pressing operation, the input module communicates with the driver through the node, takes out the capacitance change value of the finger pressing operation from the storage node of the hardware, and determines whether the finger pressing operation includes the finger joint operation by the AI algorithm corresponding to the operation based on the capacitance change value.

When the touch operation is not the finger pressing operation, determining whether the touch operation is the finger joint operation is not performed.

By the method described above, determining whether the non-finger pressing operation is the finger joint operation is eliminated, which further simplifies the calculation amount and improves the working efficiency.

Figure 3:
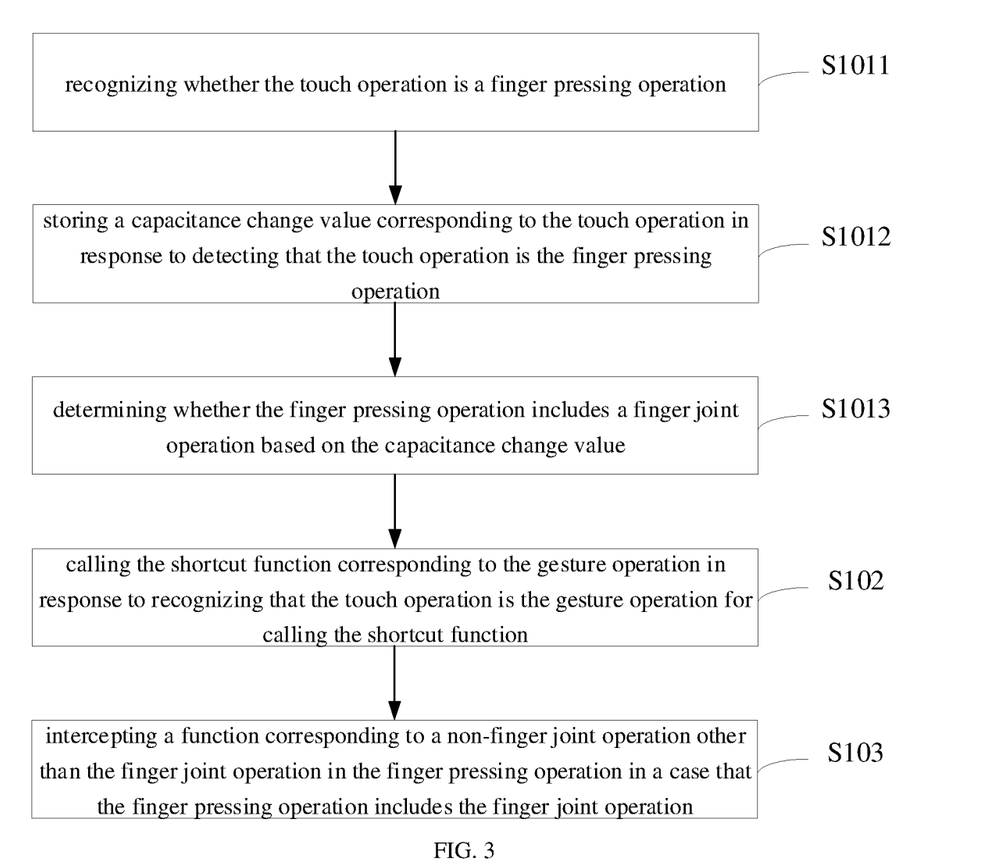
FIG. 3 is a flow chart of a method for calling a shortcut function according to an exemplary embodiment.

FIG. 3 is a flow chart of a method for calling a shortcut function according to another exemplary embodiment. In the embodiment, in addition to steps S1011, S1012, S1013, and S102, the method for calling the shortcut function also includes step S103.

At step S103, a function corresponding to a non-finger joint operation other than the finger joint operation in the finger pressing operation is intercepted in a case that the finger pressing operation includes the finger joint operation.

In an embodiment, when the finger pressing operation includes the finger joint operation, a touch operation type (which may be referred to as tooltype) of an event (which may be referred to as MotionEvent) of a current touch operation is set as the finger joint operation In an embodiment, an application layer (which may be referred to as ViewRootimpl) determines whether the current touch operation is the finger joint operation by the operation type (tooltype) of the event (MotionEvent) when receiving a signal of the event (MotionEvent). When it is determined that the current touch operation is the finger joint operation, a function corresponding to the non-finger joint operation other than the finger joint operation in the finger pressing operation is intercepted.

In an embodiment, when the touch operation touches a chatting application on the mobile terminal, if it is determined that the touch operation is the finger joint operation, a function of entering the chatting application based on a signal of the touch operation is intercepted.

Figure 4:
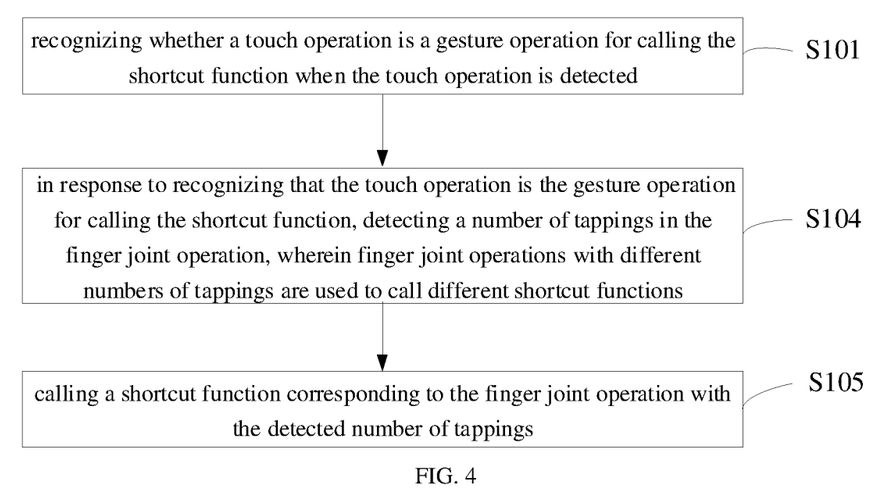
FIG. 4 is a flow chart of a method for calling a shortcut function according to an exemplary embodiment.

FIG. 4 is a flow chart of a method for calling a shortcut function according to still one exemplary embodiment. In the embodiment, in addition to step S101, the method for calling the shortcut function also includes steps S104 and S105.

At step S104, in response to recognizing that the touch operation is the gesture operation for calling the shortcut function, a number of tappings in the finger joint operation is detected, and finger joint operations with different number of tappings are used to call different shortcut functions.

At step S105, a shortcut function corresponding to the finger joint operation with the detected number of tappings is called.

When a monitoring module (which may be referred to as InputMonitor) monitors that the touch operation is the finger joint operation, the number of tappings in the finger joint operation is determined. The finger joint operations with different numbers of tappings correspond to calling different shortcut functions.

In an embodiment, the tapping operation with two successive tappings corresponds to the function for activating an intelligent assistant, such as an intelligent speaker. When the finger tapping operation with two consecutive tappings is monitored, the intelligent speaker is activated.

Figure 5:
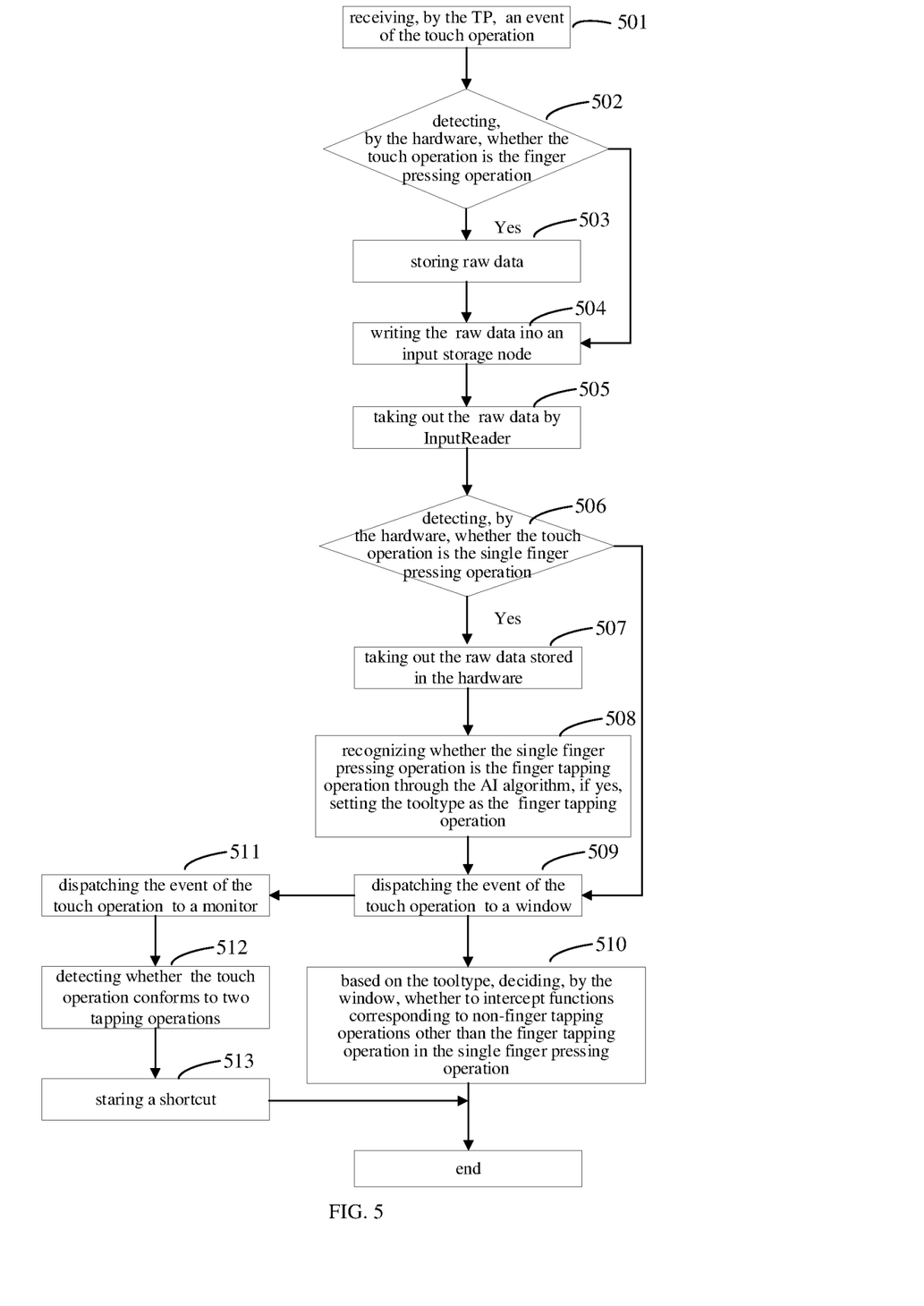
FIG. 5 is a flow chart of a method for calling a shortcut function according to an exemplary embodiment.

FIG. 5 is a flow chart illustrating a method for calling a shortcut function according to still one exemplary embodiment of the present disclosure.

As illustrated in FIG. 5, a touch panel (TP) receives an event of a touch operation (501). After the touch panel detects the touch operation, the hardware detects the touch operation to determine whether the touch operation is the finger pressing operation (502). The finger pressing operation may be the single finger pressing operation.

When the touch operation is the finger pressing operation, raw data corresponding to the touch operation, i.e., the capacitance change value, is separately stored (503) and written into an input storage node (504).

When the touch operation is not the finger pressing operation, the data corresponding to the touch operation may not be stored separately, that is, the capacitance change value may not be stored at the input storage node. Instead, other data related to the touch operation is stored at the input storage node.

The system also needs to determine whether the touch operation is the single finger pressing operation before determining whether the touch operation is the finger pressing operation based on the capacitance change value by the AI algorithm corresponding to the operation.

When the touch operation is the single finger pressing operation, the input module communicates with the driver via the node, takes out the raw data (which may be the capacitance change value) of the single finger pressing operation from the input storage node of the hardware (505), and determines whether the single finger pressing operation is the finger tapping operation based on the capacitance change value through the AI algorithm corresponding to the operation (506).

When the touch operation is not the single finger pressing operation, determining whether the touch operation is the finger tapping operation (508) is not performed. In this way, determining whether the non-single finger pressing operation is the finger tapping operation is eliminated, which further simplifies the calculation amount and improves the work efficiency.

When the touch operation is detected to be the single finger pressing operation, the input module (e.g., inputreader) directly takes out the raw data of the single finger pressing operation from the storage node (507), which reduces the procedure of discriminating and obtaining the raw data corresponding to the single finger pressing operation from numerous data of the touch operation, simplifies the calculation amount and improves the work efficiency.

The touch operation type of the event of the current touch operation is set as the finger tapping operation when the single finger pressing operation is the finger tapping operation.

The event of the touch operation is dispatched to a window (509), and the application layer determines whether the current touch operation is the finger tapping operation by the touch operation type of the event when receiving the signal of the event.

When it is determined that the current touch operation is the finger tapping operation, functions corresponding to non-finger tapping operations other than the finger tapping operation in the single finger pressing operation are intercepted (510).

When it is determined that the current touch operation is not the finger tapping operation, the function corresponding to the current touch operation is executed.

The event of the touch operation may also be dispatched to a monitor (511). The monitoring module (e.g., InputMonitor) determines the number of tappings in the finger tapping operation when monitoring that the single finger operation is the finger tapping operation. The finger tapping operations with different numbers of tappings are used to call different shortcut functions.

In an embodiment, the finger tapping operation with two consecutive tappings corresponds to the function for activating an intelligent speaker. When the finger tapping operation with two consecutive tappings is monitored (512), the intelligent speaker is activated (513).

Embodiments of the present disclosure also provide an apparatus for calling a shortcut function. The apparatus for calling the shortcut function includes hardware structures and/or software modules corresponding to respective functions. Each module in the apparatus may be implemented by hardware, or software, or a combination of hardware and software.

Figure 6:
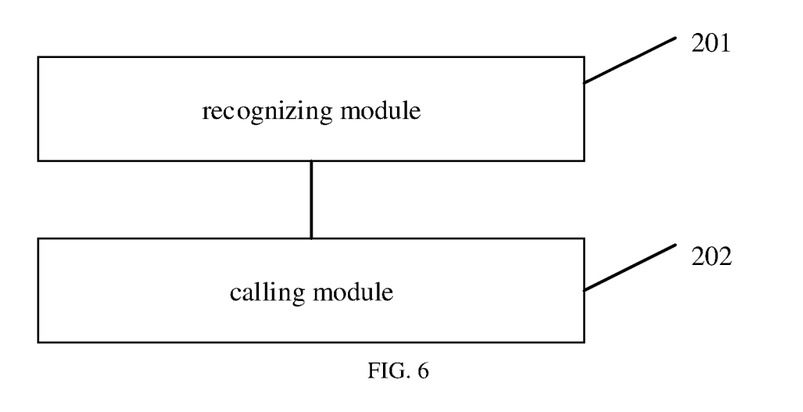
FIG. 6 is a block diagram of an apparatus for calling a shortcut function according to an exemplary embodiment.

FIG. 6 is a block diagram of an apparatus for calling a shortcut function according to an exemplary embodiment. As illustrated in FIG. 6, the apparatus for calling the shortcut function includes: a recognizing module 201 and a calling module 202.

The recognizing module 201 is configured to recognize whether a touch operation is a gesture operation for calling the shortcut function when the touch operation is detected.

The calling module 202 is configured to call the shortcut function corresponding to the gesture operation in response to recognizing that the touch operation is the gesture operation for calling the shortcut function.

In an exemplary embodiment, the recognizing module 201 is also configured to: recognize whether the touch operation is a finger pressing operation; store a capacitance change value corresponding to the touch operation in response to detecting that the touch operation is the finger pressing operation; and determine whether the finger pressing operation includes a finger joint operation based on the capacitance change value.

In an exemplary embodiment, the apparatus for calling the shortcut function also includes: an intercepting module. The intercepting module is configured to intercept a function corresponding to a non-finger joint operation other than the finger joint operation in the finger pressing operation in a case that the finger pressing operation includes the finger joint operation.

In an exemplary embodiment, the calling module 202 is also configured to: detect a number of tappings in the finger joint operation, finger joint operations with different numbers of tappings are used to call different shortcut functions; and call a shortcut function corresponding to the finger joint operation with the detected number of tappings.

In an exemplary embodiment, the shortcut function includes a screenshot function and a speech assistant function.

With respect to the apparatus in the above embodiments, specific operations by each module have been described in detail in the method embodiments, which are not repeated here.

Figure 7:
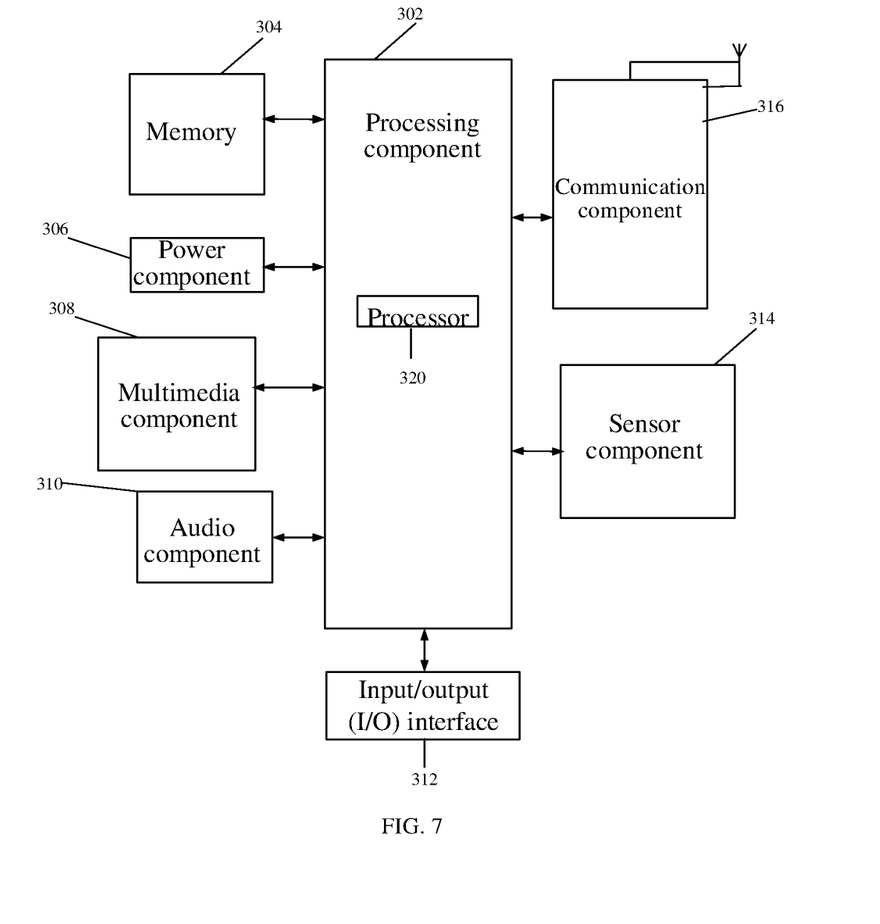
FIG. 7 is a block diagram of a device for calling a shortcut function according to an exemplary embodiment.

FIG. 7 is a block diagram illustrating a device for calling a shortcut function according to an exemplary embodiment. For example, the device for calling the shortcut function may be a mobile phone, a computer, a digital broadcasting terminal, a message sending and receiving equipment, a game controller, a tablet device, a medical device, a fitness equipment, a personal digital assistant or the like.

As illustrated in FIG. 7, the device for calling the shortcut function may include one or more of: a processing component 302, a memory 304, a power component 306, a multimedia component 308, an audio component 310, an input/output (I/O) interface 312, a sensor component 314, and a communication component 316.

The processing component 302 typically controls overall operations of the device, such as the operations associated with display, telephone calls, data communications, camera operations, and recording operations. The processing component 302 may include one or more processors 320 for executing instructions to perform all or part of the steps in the above described methods. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the device. Examples of such data include instructions, contraction data, phonebook data, messages, pictures, video, etc. for any applications or methods operated on the device for calling the shortcut function. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 is configured to provide power to various components of the device. The power component 306 may include a power management system, one or more power sources, and any other components associated with the generation, management, and distribution of power in the device.

The multimedia component 308 includes a screen for providing an output interface between the device for calling the shortcut function and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensor may not only sense a boundary of a touch or swipe action, but also sense a period and a pressure associated with the touch or swipe action. In some embodiments, the multimedia component 308 includes a front camera and/or a rear camera. The front camera and/or the rear camera may receive an external multimedia datum while the device is in an operation mode, such as a photographing mode or a video mode. Each of the front camera and the rear camera may be a fixed optical lens system or have focus and optical zoom capability.

The audio component 310 is configured to output and/or input an audio signal. For example, the audio component 310 includes a microphone ("MIC") configured to receive an external audio signal when the device for calling the shortcut function is in the operation mode, such as a call mode, a recording mode, and a voice recognition mode. The received audio signal may be further stored in the memory 304 or transmitted via the communication component 316. In some embodiments, the audio component 310 also includes a speaker for outputting audio signals.

The I/O interface 312 is configured to provide an interface between the processing component 302 and peripheral interface modules. The peripheral interface module may be such as a keyboard, a click wheel, buttons, and the like. The buttons may include, but be not limited to, a home button, a volume button, a start button, and a locking button.

The sensor component 314 includes one or more sensors for providing state assessments of various aspects of the device for calling the shortcut function. For example, the sensor component 314 may detect an open/closed state of the device, relative positioning of components, e.g., the display and the keypad of the device for calling the shortcut function, a position change of the device for calling the shortcut function or a component of the device for calling the shortcut function, a presence or absence of the user contraction with the device for calling the shortcut function, an orientation or an acceleration/deceleration of the device for calling the shortcut function, and a temperature change of the device for calling the shortcut function. The sensor component 314 may include a proximity sensor configured to detect the presence of nearby objects without any physical contact. The sensor component 314 may also include a light sensor, such as a CMOS (complementary metal-oxide-semiconductor) or a CCD (charge coupled device) image sensor, for using in an imaging application. In some embodiments, the sensor component 314 may also include an accelerometer sensor, a gyroscope sensor, a magnetic sensor, a pressure sensor, or a temperature sensor.

The communication component 316 is configured to facilitate a wired or wireless communication between the device and other devices. The device for calling the shortcut function may access a wireless network based on a communication standard, such as Wi-Fi, 4G, or 5G, or a combination thereof. In an exemplary embodiment, the communication component 316 receives a broadcast signal or broadcast associated information from an external broadcast management system via a broadcast channel In an exemplary embodiment, the communication component 316 also includes a near field communication (NFC) module to facilitate a short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the device for calling the shortcut function may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In exemplary embodiments, there is also provided a non-transitory computer-readable storage medium including instructions, such as the memory 304 including instructions. The above instructions may be executed by the processor 320 in the device for calling the shortcut function for performing the above methods. For example, the non-transitory computer readable storage medium may be a ROM, a RAM, a CD-ROM, a magnetic tape, a floppy disc, an optical data storage device, and the like.

Although the operations are described in a specific order in the accompanying drawings, it should be understood that these operations are not required to be performed in the specific order or serial order illustrated, or that all the operations illustrated are not required to be performed to obtain a desired result. In certain circumstances, multitasking and parallel processing may be advantageous.

Other embodiments of the present disclosure will be apparent to the skilled in the art from consideration of the specification and practice of the present disclosure disclosed here. This present disclosure is intended to cover any variations, uses, or adaptations of the present disclosure following the general principles thereof and including such departures from the present disclosure within known or customary practice in the art. It is intended that the specification and examples be considered as exemplary merely, with a true scope and spirit of the present disclosure being indicated by the following claims.

It should be understood that the present disclosure is not limited to the exaction construction that has been described above and illustrated in the accompanying drawings, and that various modifications and changes may be made without departing from the scope thereof. It is intended that the scope of the present disclosure only be limited by the appended claims.

What is claimed is:

1. A method for a device to call a shortcut function, comprising:
   recognizing whether a touch operation is a gesture operation for calling the shortcut function when the touch operation is detected, comprising:
      recognizing whether the touch operation is a finger pressing operation;
      in response to recognizing that the touch operation is the finger pressing operation:
         storing a capacitance change value corresponding to the touch operation at a storage node of firmware separately;
         communicating, by an input reader, with a driver via a node to take out the capacitance change value from the storage node; and
         determining whether the finger pressing operation includes a finger joint operation based on the capacitance change value, wherein the finger joint operation is a tapping operation performed through a user's finger joint; and
      in response to recognizing that the touch operation is not the finger pressing operation:
         not storing the capacitance change value separately and not determining whether the finger pressing operation includes the finger joint operation; and
   calling the shortcut function corresponding to the gesture operation in response to recognizing that the touch operation is the gesture operation for calling the shortcut function.

2. The method of claim 1, further comprising:
intercepting a function corresponding to a non-finger joint operation other than the finger joint operation in the finger pressing operation in a case that the finger pressing operation includes the finger joint operation.

3. The method of claim 1, further comprising:
detecting a number of tappings in the finger joint operation, wherein finger joint operations with different numbers of tappings are used to call different shortcut functions after recognizing that the touch operation is the gesture operation for calling the shortcut function;
wherein calling the shortcut function corresponding to the gesture operation comprises:
calling a shortcut function corresponding to the finger joint operation with the detected number of tappings.

4. The method of claim 2, further comprising:
detecting a number of tappings in the finger joint operation, wherein finger joint operations with different numbers of tappings are used to call different shortcut functions after recognizing that the touch operation is the gesture operation for calling the shortcut function;
wherein calling the shortcut function corresponding to the gesture operation comprises:
calling a shortcut function corresponding to the finger joint operation with the detected number of tappings.

5. The method of claim 3, wherein the shortcut function comprises a screenshot function and a speech assistant function.

6. The method of claim 4, wherein the shortcut function comprises a screenshot function and a speech assistant function.

7. An apparatus for calling a shortcut function, comprising:
   a processor; and
   a memory storing instructions executable by the processor,
   wherein the processor is configured to:
   recognize whether a touch operation is a gesture operation for calling the shortcut function when the touch operation is detected by performing:
      recognizing whether the touch operation is a finger pressing operation;
      in response to recognizing that the touch operation is the finger pressing operation:
         storing a capacitance change value corresponding to the touch operation at a storage node of firmware separately;
         communicating, by an input reader, with a driver via a node to take out the capacitance change value from the storage node; and
         determining whether the finger pressing operation includes a finger joint operation based on the capacitance change value, wherein the finger joint operation is a tapping operation performed through a user's finger joint; and
      in response to recognizing that the touch operation is not the finger pressing operation:
         not storing the capacitance change value separately and not determining whether the finger pressing operation includes the finger joint operation; and call the shortcut function corresponding to the gesture operation in response to receognizing that the touch operation is the gesture operation for calling the shortcut function.

8. The apparatus of claim 7, wherein the processor is further configured to:
intercept a function corresponding to a non-finger joint operation other than the finger joint operation in the finger pressing operation in a case that the finger pressing operation includes the finger joint operation.

9. The apparatus of claim 7, wherein the processor is further configured to:
detect a number of tappings in the finger joint operation, wherein finger joint operations with different numbers of tappings are used to call different shortcut functions; and
call a shortcut function corresponding to the finger joint operation with the detected number of tappings.

10. The apparatus of claim 8, wherein the processor is further configured to:
detect a number of tappings in the finger joint operation, wherein finger joint operations with different numbers of tappings are used to call different shortcut functions; and
call a shortcut function corresponding to the finger joint operation with the detected number of tappings.

11. The apparatus of claim 9, wherein the shortcut function includes a screenshot function and a speech assistant function.

12. The apparatus of claim 10, wherein the shortcut function includes a screenshot function and a speech assistant function.

13. A non-transitory computer readable storage medium having stored thereon instructions that, when executed by a processor of a device, cause the device to perform a method for calling a shortcut function, the method comprising:
recognizing whether a touch operation is a gesture operation for calling the shortcut function when the touch operation is detected, comprising:
recognizing whether the touch operation is a finger pressing operation;
in response to recognizing that the touch operation is the finger pressing operation:
storing a capacitance change value corresponding to the touch operation at a storage node of firmware separately;
communicating, by an input reader, with a driver via a node to take out the capacitance change value from the storage node; and
determining whether the finger pressing operation includes a finger joint operation based on the capacitance change value, wherein the finger joint operation is a tapping operation performed through a user's finger joint; and
in response to recognizing that the touch operation is not the finger pressing operation:
not storing the capacitance change value separately and not determining whether the finger pressing operation includes the finger joint operation; and
calling the shortcut function corresponding to the gesture operation in response to recognizing that the touch operation is the gesture operation for calling the shortcut function.

* * * * *